US009000692B2

(12) United States Patent
Aigouy et al.

(10) Patent No.: US 9,000,692 B2
(45) Date of Patent: Apr. 7, 2015

(54) LINEAR ELECTRODYNAMIC-TYPE MOTOR, CRYOCOOLER INCLUDING SUCH A MOTOR AND METHOD IMPLEMENTING SUCH A MOTOR

(75) Inventors: Gerald Aigouy, La Croix de la Rochette (FR); James Butterworth, Fontaine (FR); Benoit Debray, Sassenage (FR); Jean Christophe Rey, Le Grand Lemps (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 499 days.

(21) Appl. No.: 13/462,390

(22) Filed: May 2, 2012

(65) Prior Publication Data

US 2012/0279234 A1    Nov. 8, 2012

(30) Foreign Application Priority Data

May 2, 2011   (FR) ...................................... 11 53719

(51) Int. Cl.
  *H02K 41/00* (2006.01)
  *H02K 33/18* (2006.01)
  *F04B 35/04* (2006.01)
  *H02P 25/02* (2006.01)
(52) U.S. Cl.
  CPC .............. *H02K 33/18* (2013.01); *F04B 35/045* (2013.01); *H02P 25/02* (2013.01)
(58) Field of Classification Search
  CPC ....................................................... H02K 33/18
  USPC .................................. 318/135, 687, 671, 560
  See application file for complete search history.

(56) References Cited

U.S. PATENT DOCUMENTS 6,583,593 B2 *  6/2003  Iijima et al. ............... 318/400.32
6,883,333 B2 *  4/2005  Shearer et al. ....................... 62/6

FOREIGN PATENT DOCUMENTS

| FR | 2 909 493 | 6/2008 |
| JP | 2002 044 977 | 2/2002 |
| JP | 2010 048 150 | 3/2010 |
| WO | WO 2008 016 285 | 2/2008 |

OTHER PUBLICATIONS

French Search Report for FR1153719, mailed Feb. 17, 2012.
Chun, et al., "A Novel Strategy of Efficiency Control for a Linear Compressor System Driven by a PWM Inverter," IEEE Transactions on Industrial Electronics, vol. 55, No. 1, Jan. 2008, pp. 296-301.

\* cited by examiner

*Primary Examiner* — David S Luo

(74) *Attorney, Agent, or Firm* — Christopher J. Cronin

(57) ABSTRACT

A linear electrodynamic-type motor, for compressing a fluid circulating in a cryocooler notably using a Stirling cycle, includes a translationally movable induction coil; a power-supply circuit adapted to deliver, to at least one induction coil, an AC power-supply current; a movable mass adopting a translational movement; an induction coil arranged so as to move a respective movable mass between a first position and a second position where the movable mass can compress the fluid; and a secondary circuit arranged to connect the terminals of at least one induction coil in short-circuit. The secondary circuit comprises a compensation component for producing a phase shift between the power-supply voltage and the power-supply current, so as to reduce the phase difference that the inductance of the induction coil produces.

18 Claims, 2 Drawing Sheets

LINEAR ELECTRODYNAMIC-TYPE MOTOR, CRYOCOOLER INCLUDING SUCH A MOTOR AND METHOD IMPLEMENTING SUCH A MOTOR

CROSS-REFERENCE TO RELATED APPLICATIONS

This application claims the benefit of priority under 35 U.S.C. §119 (a) and (b) to French Patent Application No. 1153719, filed May 2, 2011, the entire contents of which are incorporated herein by reference.

BACKGROUND

1. Field of the Invention

The present invention relates to a linear electrodynamic-type motor for compressing a fluid circulating in a cryocooler, notably using a Stirling cycle. In addition, the present invention relates to a Stirling cycle cryocooler including such a motor. Furthermore, the present invention relates to a method for compressing a fluid circulating in such a cryocooler.

The present invention finds particular application in the field of alternating cycle cryogenic machines, Stirling machines or pulsed gas tubes, implementing linear electrodynamic reciprocating motors, in particular cryogenic machines intended to be placed on board spacecraft such as Earth observation satellites. In this application, a linear electrodynamic motor is used as a compressor for compressing a fluid such as helium, whose expansion causes cooling.

2. Related Art

A prior art linear electrodynamic motor generally includes two translationally movable induction coils, an AC power-supply circuit for the induction coils and two pistons connected respectively to the two induction coils. Each piston is mounted on a bearing that develops an axial elastic return force proportional to the displacement of the piston. Under the effect of cyclic magnetic forces, the induction coils drive the pistons with a reciprocating linear motion. The pistons form translationally movable masses, thereby compressing the fluid.

In order to maximize the amplitude of the displacement of each piston, and therefore the compression of the fluid, the motor is controlled so that the pistons operate at or near their mechanical resonance frequency. In addition, to the same end, the motor is designed for reducing the damping forces of the pistons, especially friction.

However, this reduction in damping forces makes the motor sensitive to vibrations and shocks, which can cause excessive oscillations of the pistons producing internal shocks between each piston and the fixed parts of the motor, which reduces the performance and/or service life of the motor. But in the field of spacecraft, launching induces many shocks and vibrations.

One solution is to equip the motor with secondary circuits connecting the respective terminals of the induction coils so as to short-circuit them. Thus, when shocks or vibrations displace the pistons, the change in magnetic flux in the coils induces, according to Lenz's law, a counter-electromotive force therein, which generates a magnetic force opposing the displacement of the pistons and damping their displacement.

However, the magnetic force generated is insufficient to damp major vibrations, especially since it is determined by the size of the induction coils. Furthermore, the inductance of an induction coil leads to a phase shift that causes a delay in the generation of the magnetic force damping the pistons which are therefore still displaced with an excessive amplitude.

SUMMARY OF THE INVENTION

The present invention is notably aimed at wholly or partly resolving the aforementioned problems.

To this end, the subject of the invention is a linear electrodynamic-type motor for compressing a fluid circulating in a cryocooler notably using a Stirling cycle, the motor including:

- at least one power-supply circuit adapted to deliver an AC power-supply current at an AC power-supply voltage;
- at least one movable mass, such as a piston, adopting a translational movement between a first position and a second position in which the movable mass can compress the fluid; and
- at least one induction coil connected to the power-supply circuit and arranged so as to transmit the translational movement to a respective movable mass;
- at least one secondary circuit arranged to be connected to the terminals of at least one induction coil; and
- at least one switching device arranged so as to selectively connect the secondary circuit to at least one induction coil.

The motor is characterized in that the secondary circuit comprises at least one compensation component adapted for producing a phase shift between said AC power-supply voltage and said AC power-supply current, so as to reduce the phase difference that the inductance of the induction coil produces between said AC power-supply voltage and said AC power-supply current.

In other words, the induction coil is temporarily supplied by means of a secondary circuit comprising components which compensate for the phase shift caused by the inductance of the induction coil and therefore which limit or avoid the delay in generating the magnetic force damping the or each piston.

Thus, in a motor according to the invention, the damping of the piston is fast and optimal, thereby increasing the performance and/or the service life of such a motor.

In the present application, the verb "connect" and its derivatives refer to an electrical connection made through the intermediary of no, one or several electrical components. In the present application, the verb "link" and its derivatives refer to a mechanical connection.

According to one embodiment, at least one compensation component is a passive electrical component.

Thus, such a compensation component is used to compensate for phase shift, in a reliable and compact manner.

According to one embodiment, at least one compensation component is selected from the group consisting of an essentially resistive component, an essentially inductive component, an essentially capacitive component, a transistor and an operational amplifier.

Thus, such a compensation component can be used to effectively compensate for the phase shift caused by the inductance of the induction coil.

According to one embodiment, at least one secondary circuit comprises two compensation components.

Thus, such a secondary circuit can be used to effectively compensate for the phase shift caused by the inductance of the induction coil.

According to one embodiment, at least one secondary circuit comprises an essentially resistive component and an essentially capacitive component, the essentially resistive component and the essentially capacitive component being connected in series.

Thus, such a secondary circuit can be used to compensate with great reactivity for the phase shift caused by the inductance of the induction coil.

According to one embodiment, at least one secondary circuit comprises an essentially resistive component and an essentially capacitive component, the essentially resistive component and the essentially capacitive component being connected in parallel.

Thus, such a secondary circuit can be used to compensate with great reactivity for the phase shift caused by the inductance of the induction coil.

According to one embodiment, the or each switching device has:
- a first position, in which the respective secondary circuit is connected to the respective induction coil; and
- a second position, in which the respective secondary circuit is disconnected from the respective induction coil.

Thus, such a switching device can be easily operated to connect or disconnect the secondary circuit to or from the respective induction coil.

According to one embodiment, the or each switching device is arranged so that:
- in the first position, the respective power-supply circuit is disconnected from the respective induction coil; and
- in the second position, the respective power-supply circuit is connected to the respective induction coil.

Thus, such a switching device can be easily operated to connect or disconnect the power-supply circuit to or from the respective induction coil.

According to one embodiment, the motor further includes at least one permanent-type magnet.

Thus, such a permanent magnet can be used to induce a magnetic flux in the induction coil.

According to one embodiment, the respective magnet is fixed, and the respective induction coil is translationally movable relative to the respective magnet.

Thus, such a construction can be used to reduce the risk of deterioration of the fixed magnet, which can be relatively fragile.

According to one embodiment, the respective induction coil is fixed and the magnet is translationally movable relative to the induction coil.

Thus, such a construction reduces the driven mass, in the case where the magnet is lighter than the induction coil.

In such an embodiment, each magnet is carried by a movable mass, for example by a piston.

According to one embodiment, the motor includes two induction coils, two power-supply circuits and two movable masses, the two movable masses being arranged so as to be displaced in parallel directions, preferably in collinear directions, and in opposite respective directions.

Thus, such a motor can be used to maximize compression, since its movable masses are displaced in phase opposition.

Furthermore, the subject of the present invention is a Stirling cycle cryocooler, the cryocooler including a compressor for compressing a fluid and a pressure reducer for expanding the fluid, the cryocooler being characterized in that the compressor further includes at least a motor as previously disclosed. Such a cooler is highly reliable.

In addition, the subject of the present invention is a method for compressing a fluid circulating in a Stirling cycle cryocooler, the method being characterized in that it implements a motor as disclosed above and in that it includes the alternative steps:

- in a service mode, delivering an AC power-supply current to at least one respective induction coil so as to transmit a translational movement to a respective movable mass between a first position and a second position in which the respective movable mass can compress the fluid, or
- in a damping mode, when a shock and/or vibration is detected, reducing the phase difference that the inductance of the induction coil produces between the AC power-supply voltage and the AC power-supply current, so as to generate a magnetic force adapted for damping or cancelling a displacement of a respective movable mass resulting from said shock and/or said vibration.

BRIEF DESCRIPTION OF THE FIGURES

The present invention will be best understood and its advantages will also become apparent in the light of the following description, given solely by way of a non-restrictive example and with reference to the accompanying drawings, in which.

DETAILED DESCRIPTION OF THE INVENTION

Figure 1:
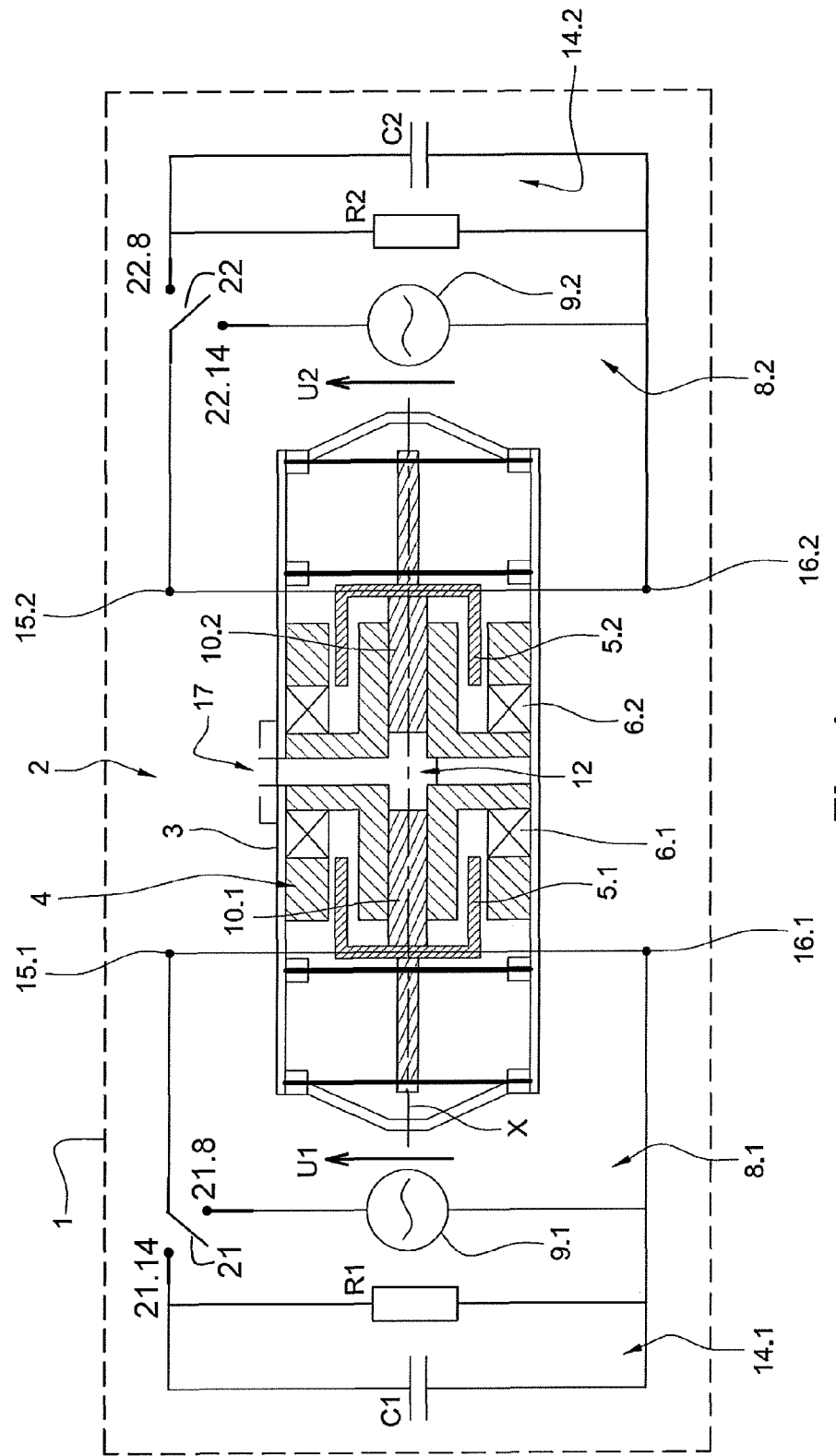
FIG. 1 is a partial sectional view of a cryocooler according to a first embodiment of the invention and which includes a motor according to a first embodiment of the invention.

FIG. 1 shows a cryocooler 1 which is of the Stirling cycle type and which can be placed on board a spacecraft, not shown, such as an Earth observation satellite.

The cryocooler 1 includes a compressor 2 for compressing a cooling fluid, and a pressure reducer, not shown, for expanding the fluid. The compressor 2 includes a housing 3 and a linear electrodynamic-type motor 4. The motor 4 is fitted in the housing 3.

The motor 4 has the function of compressing the fluid. The motor 4 includes two induction coils 5.1 and 5.2, which are similar in the example of the figures. Each induction coil 5.1 and 5.2 is formed of a winding of turns having the general shape of a cylinder of axis X.

The motor 4 further includes two permanent-type magnets 6.1 and 6.2. In the example of the figures, the magnets 6.1 and 6.2 are similar. Each magnet 6.1 or 6.2 has a generally annular shape. Each magnet 6.1 or 6.2 is fixed relative to the casing 3. Each magnet 6.1 or 6.2 is arranged for inducing a magnetic flux in the respective induction coil 5.1 or 5.2. In the example of the figures, the magnets 6.1 and 6.2 are arranged radially outside the coils 5.1 and 5.2.

The motor 4 further includes two power-supply circuits 8.1 and 8.2, to which the induction coils 5.1 and 5.2 are respectively connected. Thus, the power-supply circuits 8.1 and 8.2 can deliver, respectively, to the induction coils 5.1 and 5.2, power-supply currents I1 and I2 which are AC and which are delivered at power-supply voltages U1 and U2 that are also AC.

To this end, each power-supply circuit 8.1 or 8.2 includes a respective generator 9.1 or 9.2 connected to terminals 15.1, 16.1 or 15.2, 16.2 of the induction coils 5.1 and 5.2.

Under the effect of the power-supply current I1 or I2, each induction coil 5.1 or 5.2 is translationally movable along the axis X. Each induction coil 5.1 or 5.2 is translationally movable relative to the housing 3 and to the magnets 6.1 and 6.2.

The motor 4 further includes two pistons 10.1 and 10.2 which are similar and which are integral respectively with the induction coils 5.1 and 5.2 and in translation along the axis X.

Each piston 10.1 or 10.2 forms a movable mass which is linked to a respective induction coil 5.1 or 5.2 so that the induction coil 5.1 or 5.2 displaces the piston 10.1 or 10.2 in a translational movement having, in the example of the figures, a linear trajectory of axis X. Each induction coil 5.1 or 5.2 is thus arranged so as to transmit a translational movement to a respective piston 10.1 or 10.2.

The static parts of the motor 4 define a chamber 12 containing the fluid to be compressed. The pistons 10.1 and 10.2 are movable between a first position, visible in FIG. 1, and a second position in which the pistons 10.1 or 10.2 can compress the fluid in the chamber 12.

The pistons 10.1 and 10.2 are arranged so as to be displaced in directions collinear with the axis X and in opposite respective directions. In other words, when they are in motion, the pistons 10.1 and 10.2 move towards or away from one another. FIG. 1 illustrates their second position in which the pistons 10.1 and 10.2 are closest to one another and the chamber 12.

Their first position is that in which the pistons 10.1 and 10.2 are farthest away from one another. In this first position, elastic return members belonging to the motor 4, such as flexible membranes, exert forces bringing the pistons 10.1 and 10.2 to their second position. These forces are proportional to the displacements of the pistons 5.1 and 5.2.

The motor 4 further includes two secondary circuits 14.1 and 14.2 which are similar and which are arranged for being connected respectively to the terminals 15.1, 16.1 and 15.2, 16.2 of the induction coils 5.1 or 5.2.

The motor 4 includes two switching devices or switches 21 and 22, respectively arranged so as to selectively connect each secondary circuit 14.1 or 14.2 to a respective induction coil 5.1 or 5.2. Each switch 21 or 22 may be formed of a relay, an insulated-gate field-effect transistor more commonly called a MOSFET (English acronym of "Metal Oxide Semiconductor Field Effect Transistor"), an active component, etc.

In the example of the figures, each switch 21 or 22 is bistable, so it has:
- a first position, represented by the position 21.14 in FIG. 1, in which the respective secondary circuit 14.1 or 14.2 is connected to the respective induction coil 5.1 or 5.2; and
- a second position, represented by the position 21.8 in FIG. 1, in which the respective secondary circuit 14.1 or 14.2 is disconnected from the respective induction coil 5.1 or 5.2.

Each switch 21 or 22 is arranged so that:
- in the first position (21.14), the respective power-supply circuit 8.1 or 8.2 is disconnected from the respective induction coil 5.1 or 5.2; this first position (21.14) is implemented when the motor 4 is in operation, i.e. generally when the motor 4 is not subjected to shocks or vibrations transmitted by the spacecraft supporting it (stationary phase, in flight); and
- in the second position (21.8), the respective power-supply circuit 8.1 or 8.2 is connected to the respective induction coil 5.1 or 5.2; this second position (21.8) is implemented when the motor 4 is shut down or on standby, i.e. generally when the motor 4 is subjected to shocks or vibrations transmitted by the spacecraft supporting it (transient phase, on take-off).

The secondary circuit 14.1 comprises a resistive component or resistance R1 and a capacitive component or capacitor C1. In the example of FIG. 1, the resistance R1 and the capacitor C1 are connected in parallel.

The resistance R1 and the capacitor C1 form two passive electrical components, called "compensation" components since they are adapted for producing a phase shift between the power-supply voltage U1 and the power-supply current I1, so as to reduce the phase difference that the inductance of the induction coil 5.1 produces between the power-supply voltage U1 and the power-supply current I1.

Similarly, the secondary circuit 14.2 comprises a resistive component or resistance R2 and a capacitive component or capacitor C2. In the example of FIG. 1, the resistance R2 and the capacitor C2 are connected in parallel.

The resistance R2 and the capacitor C2 form two passive electrical components, called "compensation" components since they are adapted for producing a phase shift between the power-supply voltage U2 and the power-supply current I2, so as to reduce the phase difference that the inductance of the induction coil 5.2 produces between the power-supply voltage U2 and the power-supply current I2.

In a manner known in itself, the inductance of the induction coil 5.1 produces a phase difference between the power-supply voltage U1 and the power-supply current I1, the power-supply voltage U1 being in phase advance over the power-supply current I1. Similarly, the inductance of the induction coil 5.2 produces a phase difference between the power-supply voltage U2 and the power-supply current I2, the power-supply voltage U2 being in phase advance over the power-supply current I2.

Insofar as the secondary circuit 14.1 is similar to the secondary circuit 14.2, the description of the secondary circuit 14.1, given below in relation to FIG. 1, can be transposed to the secondary circuit 14.2.

The secondary circuit 14.1, with the resistance R1 and the capacitor C1 in parallel, produces a phase shift $\delta\phi_{14.1}$ evaluated in degrees as follows:

$$\delta\phi_{14.1}(\text{degrees}) = -\arctan(2\pi \cdot f R1 \cdot C1)$$

with:
- f frequency of the external source of mechanical vibration
- arctan: arc tangent function
- $\pi$: irrational number approximately equal to 3.141593 . . .

The value of the resistance R1 and the capacitance of the capacitor C1 are determined so as to compensate for all or part of the phase difference produced by the inductance of the induction coil 5.1 or 5.2. In the example of the figures, the value of the resistance R1 and the capacitance of the capacitor C1 are respectively equal to 1 ohm and 1 millifarad (mF).

In service, the motor 4 is implemented by a method according to the invention for compressing a fluid circulating in the cryocooler 1.

Each power-supply circuit 8.1 or 8.2 supplies an induction coil 5.1 or 5.2, as each generator 9.1 or 9.2 delivers a power-supply current I1 or I2 at a power-supply voltage U1 or U2.

Each induction coil 5.1 or 5.2 generates cyclic magnetic forces, which drive each piston 10.1 or 10.2 with a reciprocating linear motion along the axis X, and in opposite directions. The pistons 10.1 and 10.2 compress the fluid when they arrive simultaneously at the second position, i.e. closest to the chamber 12. The fluid then flows to a pipe 17 which leads out of the compressor 2 and to a pressure reducer, not shown.

For maximizing the amplitude of displacement of each piston 10.1 or 10.2, and therefore maximizing the compression of the fluid, the motor 4 is controlled so that the pistons 10.1 and 10.2 operate at or near their mechanical resonance frequency.

Thus, in a service mode, the AC power-supply current I1, I2 is delivered to each induction coil 5.1, 5.2 so as to transmit a translational movement to a respective movable mass 10.1, 10.2 between a first position and a second position in which the respective movable mass 10.1, 10.2 can compress the fluid.

When a shock or vibrations occur, the change in magnetic flux in the induction coils 5.1 and 5.2 induces, according to Lenz's law, a counter-electromotive force therein, which generates a magnetic force opposing the displacement of the pistons 10.1 and 10.2 and damping their displacement.

As disclosed above, the secondary circuit 14 compensates for the phase difference, so that the magnetic force is generated with little or no delay on any vibrations or shock that occurs, especially at the resonance frequency of the pistons.

In a damping mode, when a shock and/or vibration is detected, the phase difference that the inductance of the induction coil 5.1, 5.2 produces between the AC power-supply voltage U1, U2 and the AC power-supply current is reduced, so as to generate a magnetic force adapted for damping or cancelling of a respective movable mass 10.1, 10.2 resulting from the shock and/or vibration.

Thus, the displacement of the pistons 10.1 and 10.2 is suitably damped.

Figure 2:
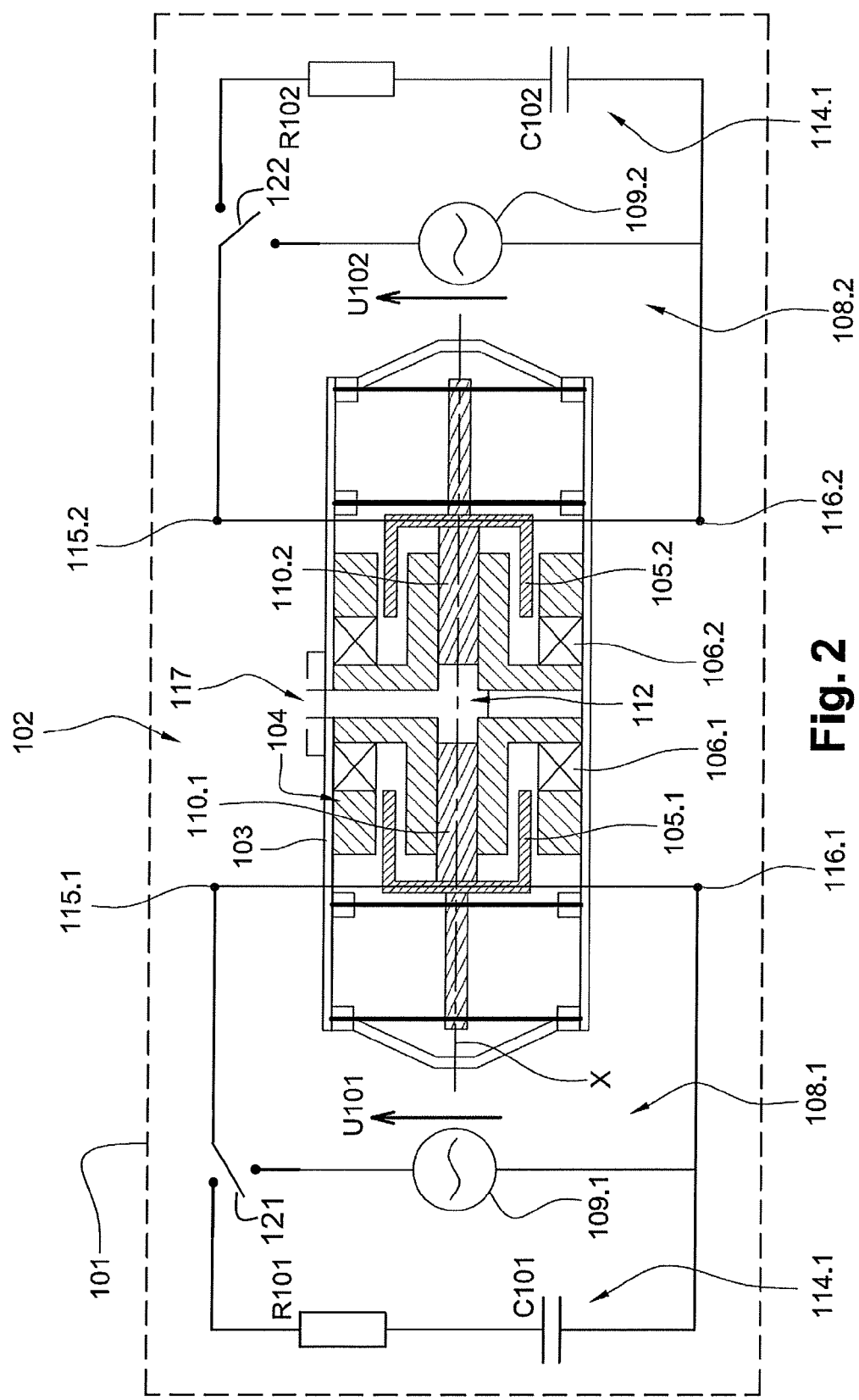
FIG. 2 is a similar view to FIG. 1 of a cryocooler according to a second embodiment of the invention and which includes a motor according to a second embodiment of the invention.

FIG. 2 shows a cryocooler 101 and a motor 104 similar to the cryocooler 1 and the motor 4. The description of the cryocooler 1 and the motor 4 given above in relation to FIG. 2 can be transposed to the cryocooler 101 and the motor 104, except for the differences set out below.

An element of the cryocooler 101 similar or corresponding to an element of the cryogenic cooler 1 bears the same numeric reference increased by 100. Thus defined are the cryocooler 101, a compressor 102, a housing 103, the motor 104, induction coils 105.1 and 105.2, magnets 106.1 and 106.2, power-supply circuits 108.1 and 108.2, generators 9.1 and 9.2, power-supply voltages U1 and U2 and power-supply currents 11 and 12, pistons 10.1 and 10.2, a chamber 112, secondary circuits 114.1 and 114.2, terminals 115.1, 116.1 and 115.2, 116.2, resistances R101 and R102 and capacitors C101 and C102, a pipe 117 and switches 121 and 122.

The cryocooler 101 differs from the cryocooler 1, since the resistance R101 and the capacitor C101 are connected in series and since the resistance R102 and the capacitor C102 are connected in series.

Insofar as the secondary circuit 114.1 is similar to the secondary circuit 114.2, the description of the secondary circuit 114.1, given below in relation to FIG. 2, can be transposed to the secondary circuit 114.2.

The secondary circuit 114.1, with the resistance R101 and the capacitor C101 in series, produces a phase shift Delta.Phi.114.1 evaluated in degrees as follows:

$$\delta\phi_{114.1}(\text{degrees}) = -90 + \arctan(2\pi \cdot f \cdot R101 \cdot C101)$$

with:
f: frequency of the external source of mechanical vibration
arctan: arc tangent function
$\pi$: irrational number approximately equal to 3.141593 . . .

The value of the resistance R1 and the capacitance of the capacitor C1 are determined so as to compensate for all or part of the phase difference produced by the inductance of the induction coil 105.1 or 105.2. In the example of the figures, the value of the resistance R101 and the capacitance of the capacitor C101 are respectively equal to 1 ohm and 1 millifarad (mF).

According to other advantageous but optional characteristics, taken singly or in any technically permissible combination:

At least one secondary circuit includes more than two compensation components, three for example.

At least one compensation component is selected from the group consisting of an essentially inductive component, a transistor and/or an operational amplifier.

Instead of a switch, the motor includes two switches arranged to each control a respective branch of the power-supply circuit, so as to selectively connect the secondary circuit to at least one induction coil.

Instead of two respective fixed magnets and two respective movable induction coils, the motor may include two respective movable induction coils and two respective fixed magnets. In such a variant, each magnet is carried by a movable mass, for example by a piston.

In a variant including a bistable switch, a neutral position may be provided between the two contact positions, in which the induction coil is not connected to any circuit.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A linear electrodynamic-type motor, for compressing a fluid circulating in a cryocooler notably using a Stirling cycle, the motor comprising:

at least one power-supply circuit adapted to deliver an AC power-supply current at an AC power-supply voltage, at least one movable mass, such as a piston, adopting a translational movement between a first position and a second position in which a respective one of the at least one movable mass can compress the fluid; and at least one induction coil connected to the power-supply circuit and arranged so as to transmit the translational movement to a respective one of the at least one removable mass;

at least one secondary circuit arranged to be connected to the terminals of at least one induction coil; and at least one switching device arranged so as to selectively connect the secondary circuit to at least one induction coil, wherein:

the secondary circuit comprises at least one compensation component adapted for producing a phase shift between said AC power-supply voltage and said AC power-supply current so as to reduce a phase difference that an inductance of the induction coil produces between said AC power-supply voltage and said AC power-supply current;

each at least one switching device has a first position, in which the respective secondary circuit is connected to the respective induction coil; the or each switching device has a second position, in which the respective secondary circuit is disconnected from the respective induction coil;

the or each switching device is arranged so that, in the first position, the respective power-supply circuit is disconnected from the respective induction coil; and the or each switching device is arranged so that, in the second position, the respective power-supply circuit is connected to the respective induction coil.

2. The motor of claim 1, wherein said at least one compensation component is a passive electrical component.

3. The motor of claim 1, wherein said at least one compensation component is selected from the group consisting of an essentially resistive component, an essentially inductive component, an essentially capacitive component, a transistor and an operational amplifier.

4. The motor according to claim 3, wherein said at least one secondary circuit comprises an essentially resistive component and an essentially capacitive component, the essentially resistive component and the essentially capacitive component being connected in series.

5. The motor according to claim 4, wherein said at least one secondary circuit comprises an essentially resistive component and an essentially capacitive component, the essentially resistive component and the essentially capacitive component being connected in parallel.

6. The motor of claim 1, wherein said at least one secondary circuit comprises two compensation components.

7. The motor according to claim 6, wherein said at least one secondary circuit comprises an essentially resistive component and an essentially capacitive component, the essentially resistive component and the essentially capacitive component being connected in series.

8. The motor according to claim 6, wherein said at least one secondary circuit comprises an essentially resistive component and an essentially capacitive component, the essentially resistive component and the essentially capacitive component being connected in parallel.

9. The motor of claim 1, further comprising at least one permanent-type magnet.

10. The motor of claim 9, wherein each of said at least one magnet is fixed, and an associated one of said at least one induction coil is translationally movable relative to an associated one of said at least one magnet.

11. The motor of claim 9, wherein each of said at least one induction coil is fixed, and an associated one of said magnet is translationally movable relative to the associated coil.

12. The motor of claim 1, wherein:
said at least one induction coil comprises two induction coils, said at least one power supply circuit comprises two power-supply circuits, and said at least one movable mass comprises two movable masses;
the two movable masses being arranged so as to be displaced in opposite directions.

13. The motor of claim 1, wherein:
the secondary circuit is separate from the power-supply circuit; and
the secondary circuit does not comprise any active-type electrical power-supply device including current generators.

14. The motor of claim 1, wherein the at least one power supply circuit contains an active-type electrical power-supply device including current generators.

15. A Stirling cycle cryocooler, the cryocooler including a compressor for compressing a fluid and a pressure reducer for expanding the fluid, the cryocooler being characterized in that the compressor includes the motor according to claim 1.

16. A method for compressing a fluid circulating in a Stirling cycle cryocooler, comprising the use of the motor of claim 1 in a service mode wherein an AC power-supply current is delivered to at least one respective induction coil so as to transmit a translational movement to a respective movable mass between a first position and a second position in which the respective movable mass can compress the fluid.

17. The method of claim 16, further comprising the step of:
using the motor in a damping mode when a shock and/or vibration is detected, wherein a phase difference that the inductance of the induction coil produces between the AC power-supply voltage and the AC power-supply current is reduced, so as to generate a magnetic force adapted for damping or cancelling a displacement of a respective movable mass resulting from said shock and/or vibration.

18. A method for compressing a fluid circulating in a Stirling cycle cryocooler, comprising the use of the motor of claim 1 in a damping mode when a shock and/or vibration is detected, wherein a phase difference that the inductance of the induction coil produces between the AC power-supply voltage and the AC power-supply current is reduced, so as to generate a magnetic force adapted for damping or cancelling a displacement of a respective movable mass resulting from said shock and/or vibration.

* * * * *